Figure 1:
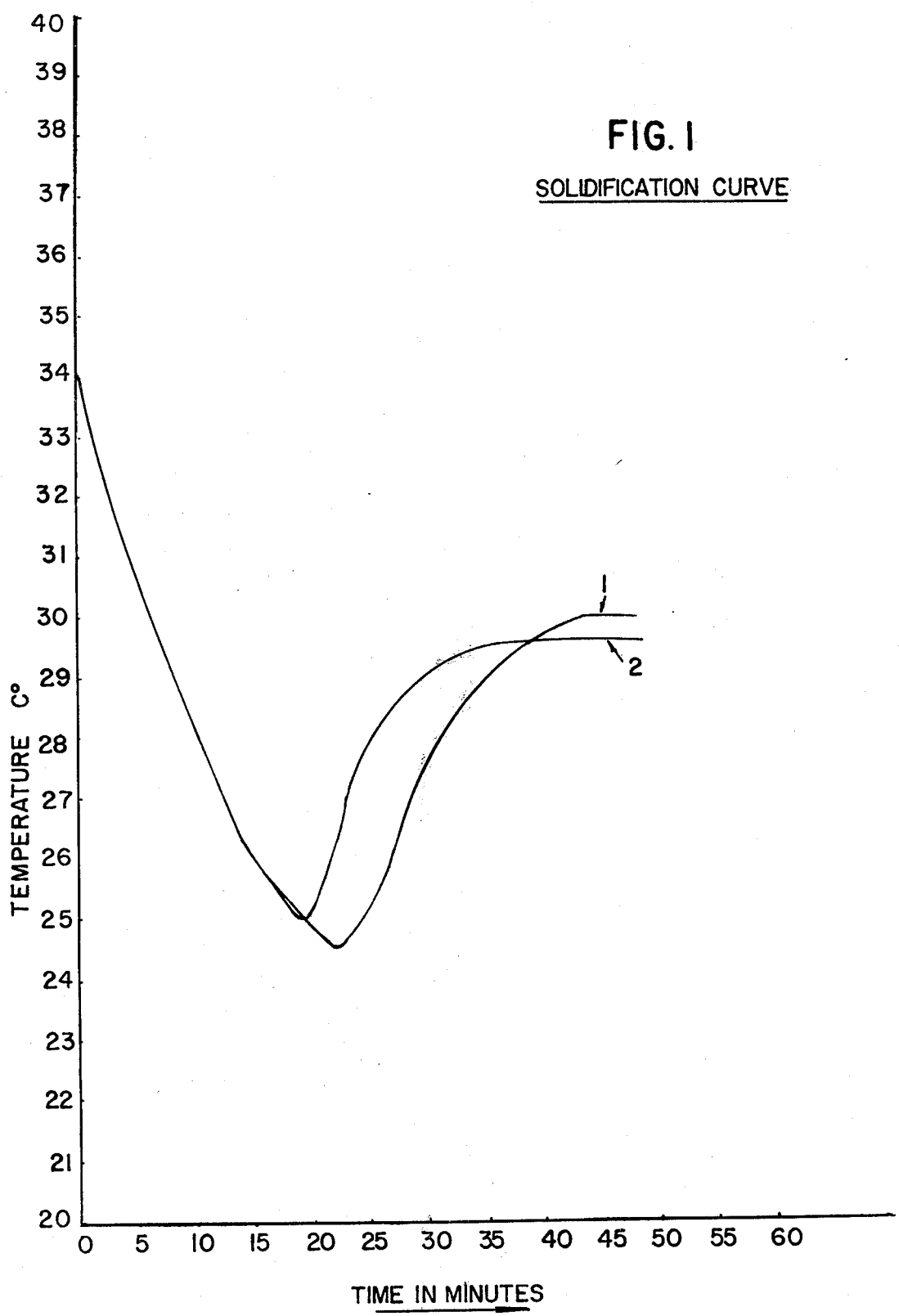

United States Patent [19]
Shenoy et al.

[11] 4,179,456
[45] Dec. 18, 1979

[54] PROCESS FOR THE PRODUCTION OF MODIFIED VEGETABLE FATS

[75] Inventors: Raghuram D. Shenoy; Anantharam Ganapathy, both of Bombay, India

[73] Assignee: Cadbury India Limited, Bombay, India

[21] Appl. No.: 872,150

[22] Filed: Jan. 25, 1978

[51] Int. Cl.² .................. C11C 3/12; A23D 5/00; A23G 1/00
[52] U.S. Cl. ................... 260/409; 260/424; 426/417; 426/607
[58] Field of Search ............ 260/409, 424, 428; 426/417, 607

[56] References Cited

U.S. PATENT DOCUMENTS

| 3,431,116 | 5/1969 | Feuge et al. | 260/409 |
| 4,006,264 | 2/1977 | Gooding | 426/417 |
| 4,041,188 | 8/1977 | Cottier et al. | 426/607 |
| 4,060,646 | 11/1977 | Bringi et al. | 426/607 |

FOREIGN PATENT DOCUMENTS

| 443058 | 9/1974 | U.S.S.R. | 260/424 |
| 499695 | 11/1976 | U.S.S.R. | 426/607 |

Primary Examiner—P. E. Konopka
Attorney, Agent, or Firm—Ladas, Parry, Von Gehr, Goldsmith & Deschamps

[57] ABSTRACT

A process is disclosed for the production of modified vegetable fats comprising partial hydrogenation of the fats at 100° to 180° C. to harden the fats followed by thermal crystallization of a high melting fraction of the fats at 30° to 40° C.

8 Claims, 4 Drawing Figures

SOLIDIFICATION CURVE

DILATATION CURVES

DSC MELTING CURVE COCOA BUTTER

DSC MELTING CURVE
SAL-FAT LOW MELTING FRACTION

PROCESS FOR THE PRODUCTION OF MODIFIED VEGETABLE FATS

This invention relates to the production of modified vegetable fats. These are capable of replacing at least part of the cocoa butter present in the chocolate and other confectionery products.

Cocoa butter, the natural fat of cocoa bean (*Theobroma cacao* L) is an essential constituent of all chocolates and confectionery products. In the manufacture of high quality chocolates the roasted cocoa bean is shelled and the nib ground. To this ground nib, which is called cocoa liquor are added sugar, silk solids, cocoa butter, emulsifiers and flavourings. The physical characteristics of such chocolates arise mainly from the cocoa butter present. Cocoa butter melts completely at 35° C. or slightly below body temperature: it is a hard brittle solid at normal room temperature. Cocoa butter is used in chocolates and confectionery products largely because its physical properties contribute to glossy coatings, absence of waxiness and favourable volume changes in the moulding operation.

A great deal of research work has been done by various workers to develop a substitute for at least part of the cocoa butter added during the manufacture of chocolate, a fat which can be used to make chocolate from partly or completely defatted ground cocoa bean or as a coating for confections. Oils and fats containing essentially C 16 and C 18 fatty acids would logically be preferred as raw materials for making cocoa butter substitutes. Most common of these are palm oil, cottonseed oil, Borneo tallow and mowrahfat.

It is the object of the present invention to provide a modified fat compatible with cocoa butter and having the following physical characteristics when admixed with cocoa butter and milk fat:
1. A very short melting range
2. Melting readily in the mouth without having a waxy taste
3. Quickly hardening
4. Resistance to formation of grey cast and surface bloom.
5. Compatibility with defatted cocoa powder, cocoa liquor and milk fat individually or in a mixture, and,
6. Controlled shrinkage during cooling for satisfactory mould release.

The essential characteristics and measurements necessary to determine the quality and suitability of a cocoa butter substitute for use in chocolate manufacture are:-
1. Melting behaviour
2. Melting dilatation
3. Hardness
4. Solidification and sugar cooling characteristics
5. Stability towards oxidative rancidity and,
6. Taste and appearance.

We have found that a cocoa butter substitute meeting the above mentioned requirements can be prepared from a vegetable butter, known as Shorea Robusta Seed Fat, containing substantial quantities of both disaturated and diunsaturated glycerides of $C_{16}$, $C_{18}$ and $C_{20}$ acids.

Sal, botanically known as *Shorea rubusta*, grows abundantly in the States of Madhya Pradesh, Uttar Pradesh, Orissa and Bihar in India. Cocoa butter is hard and brittle at 30° C. Unlike this, sal fat is greasy at this temperature. This fat crystallises in a coarse and grainy crystalline mass, occluding some amount of liquid fat which tends to separate out on standing. For this reason, sal fat cannot be used as a complete substitute for cocoa butter, even though it melts within a narrow range of 36° C.–38° C.

According to the present invention there is provided a process for the production of modified vegetable fats which comprises partially hydrogenating a refined, bleached and deodorised vegetable fat containing glycerides of $C_{16}$, $C_{18}$ and $C_{20}$ acids in the presence of a conventional metal catalyst to obtain hardened fat and removing from said hardened fat high melting glycerides by thermal crystallisation at a temperature of about 30° C.–40° C.

The purpose of the partial hydrogenation is to harden the liquid fat that separates out from the crystallised sal fat thereby making the fat more stable towards oxidative rancidity and uniform in its consistency. The iodine value of raw sal fat varies from 38 to 45. This variation in iodine number is due to the varying amounts of glycerides of polyunsaturated fatty acids present in the raw fat.

The hydrogenation is carried out using a conventional metal catalyst such as nickel, copper, palladium, platinum or a complex catalyst such as copper chromium using a support Kieselgahr or any other diatomaceous earth. The amount of catalyst used is not critical and may be varied, say from 0.05% to 2% by weight or even more, but the usual range is 0.05 to 1%. The hydrogenation reaction is preferably carried out using a supported fresh nickel catalyst and the suitable temperature range is from about 100° C.–180° C. The reaction is carried out at pressures preferably not exceeding 50 lb. per sq. in., and more preferably between atmospheric and 35 lb. sq. in. The time of hydrogenation may vary e.g., from about 10 minutes to about an hour or more according to the iodine value of the raw material. The hydrogenated fat should preferably contain less than 2% of trisaturated glycerides.

The thermal crystallisation according to our invention is so devised that 10 to 20% of the high melting glycerides by weight of the hardened sal fat is removed. The removal of high melting glycerides from hardened sal fat is essential to obtain a low melting fraction which melts sharply at body temperature and is free from any waxiness. In order to achieve this the hardened sal fat is kept under controlled temperature in the melted form, when the high melting glycerides crystallise and settle at the bottom of the crystallisation vessel. This high melting fraction can find an application as a seeding material in the thermal crystallisation technique. A suitable temperature range for thermal crystallisation is, for example, from about 30° C.–40° C., particularly 33° C. to 38° C.; and especially 34° C. to 36° C. The time required for the thermal crystallisation of high melting glycerides may vary e.g., from about 36 hours to 72 hours or more depending on the temperature range chosen and/or the desired percentage of the high melting glycerides to be removed. The iodine value of the desired low melting fraction may vary from about 37 to 40.

Undesirable tannins and phenols, with special reference to ellagic acid, generally occur in raw vegetable facts, as for example raw sal fat. Ellagitannis are complex ester glycosides and occur largely in myrobalans and oak galls. The deposition of ellagic acid is one of the causes of the unappetizing haziness which sometimes develops in fruit juices.

According to the present invention, in order to remove ellagic acid and ellagitannis from raw sal fat, a reagent containing sodium acetate and acetic acid buffer (pH 4.5) is used. This reagent is added to the raw sal fat to an extent of 0.5% to 2% by weight as a 10% solution. This reagent complexes the ellagic acid present in raw sal fat and removes it in the present novel refining process. The removal of ellagic acid from raw sal fat by this procedure was confirmed by using spectrophotometric techniques.

According to this invention other vegetable fats such as mowrah, phulwara, mange kernel and the like can also be used as starting materials individually or in combination with one another or with sal fat for preparation of a cocoa butter-like fat by adopting similar steps such as hydrogenation followed by fractionation by thermal crystallisation.

The following example in which all parts are by weight illustrates the invention.

EXAMPLE

A sample of raw sal fat was treated with sodium acetate-acetic acid reagent and then washed with warm water.

On analysis by spectrophotometry it was noticed that after the pretreatment of raw sal fat with the sodium acetate-acetic acid reagent the absorbance at 255 m u and 366 m u with reference to phenols similar to ellagic acid and ellagic acid and ellagitannine was found to have undergone a sharp reduction.

Neutralisation of the degummed sal fat was carried out successfully with 10% aqueous caustic soda solution at 40° C. The acid value of the neutralised fat was 0.15. Bleaching of the neutralised fat was carried out at 80° C. using activated earth (2% to 5%) and activated carbon (0.2 to 1%) under high vaccum.

The refined and bleached sal fat was then hydrogenated at 135° C. in the presence of 0.5% of a fresh nickel catalyst containing 18% Ni on Keiselguhr, at a guage pressure of 20 lb. per sq. in. for a period of 40 minutes in a pressure vessel with stirring, until the iodine value of the fat reached the desired range 33 to 36. Under these conditions of hydrogenation the trans-isomer content of the product, measured by infra-red absorption spectrophotometry, was about 2% of the total hydrogenated material. The hydrogenated fat was filtered to remove the Nickel catalyst and then post-bleached to remove traces of Nickel using bleaching earth. The hardened fat was fractionated by thermal crystallisation for 48 hours at 37° C. to remove high melting glycerides. The high melting glycerides (15%) that crystallised were removed by filtration and the low melting fraction (85%) consisted of the desired fraction having previously stated characteristics.

The modified vegetable fat thus prepared is harder than cocoa butter at all temperatures upto its melting temperature in the neighbourhood of 37° C. This fat melts sharply at 37° C. This is higher than that of cocoa butter by 2° C., a desirable characteristic for tropical countries. This fat exhibited a polymorphic behaviour similar to that of cocoa butter, with no liquid phase separating at ambient temperatures. It is also compatible with cocoa butter in all proportions without formation of eutectics. The substitute fat exhibited a temperature rise of 4.0° C.–5.0° C. on solidification as compared with approximately 5° C. for cocoa butter.

Figure 2:
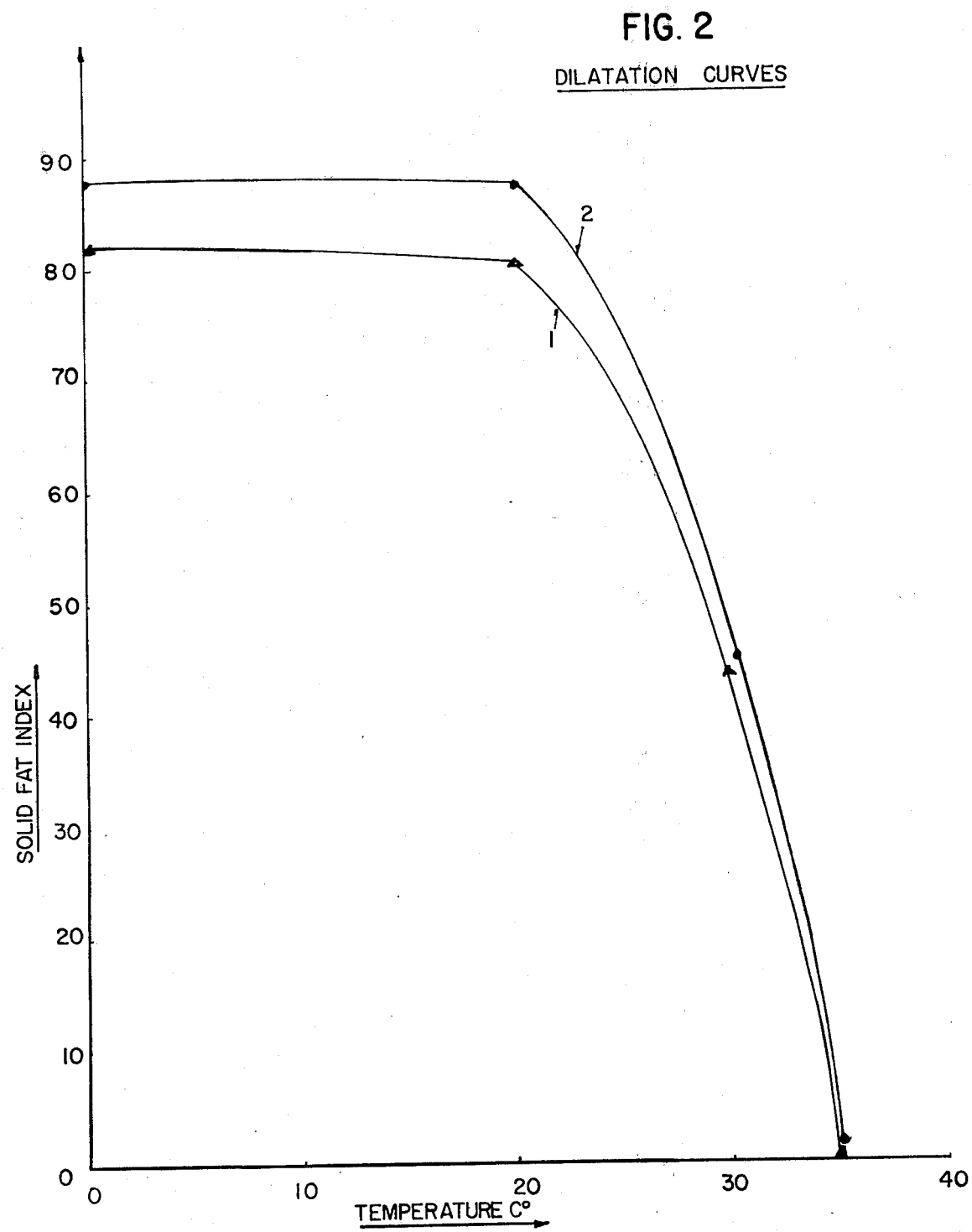
Figure 3:
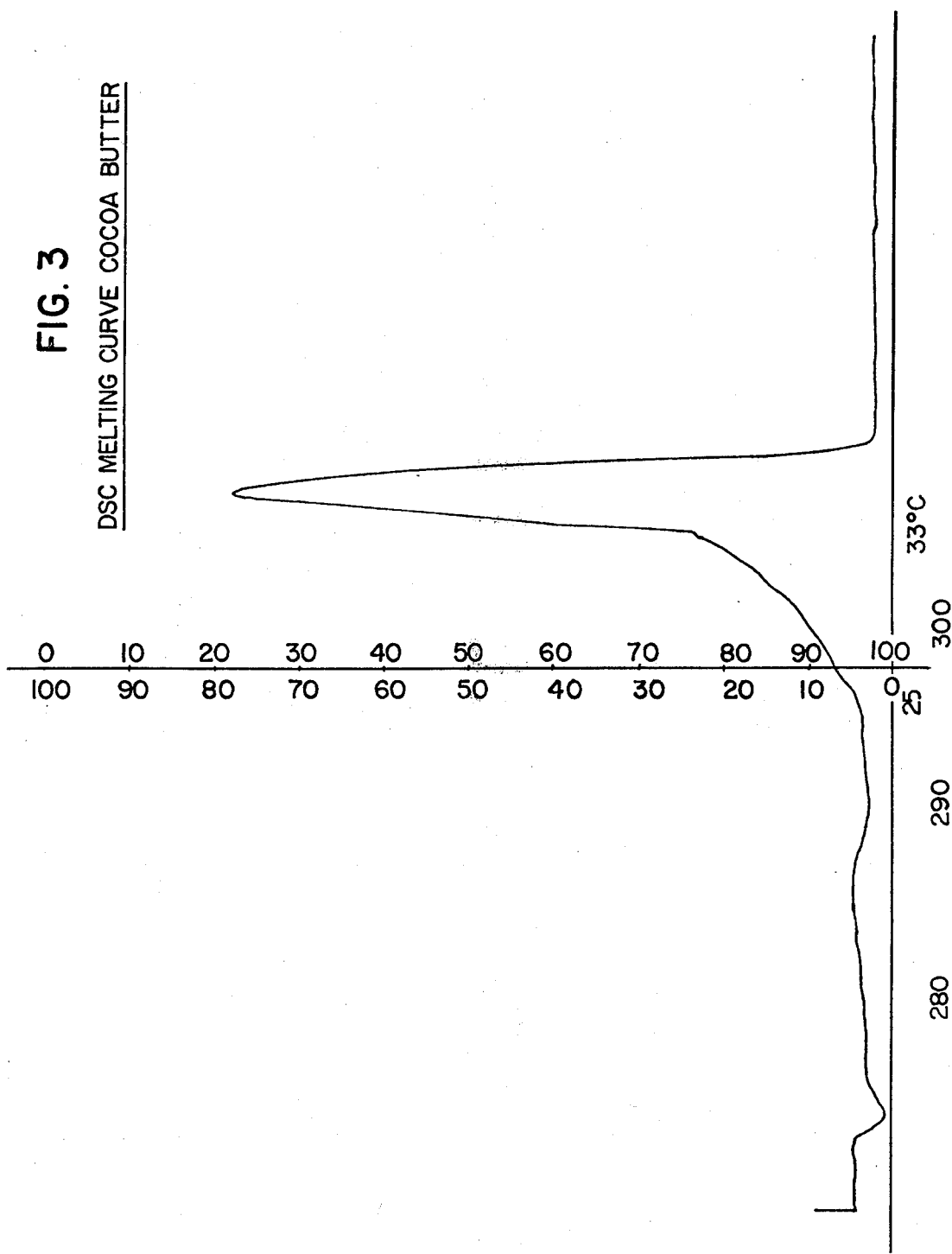
Figure 4:
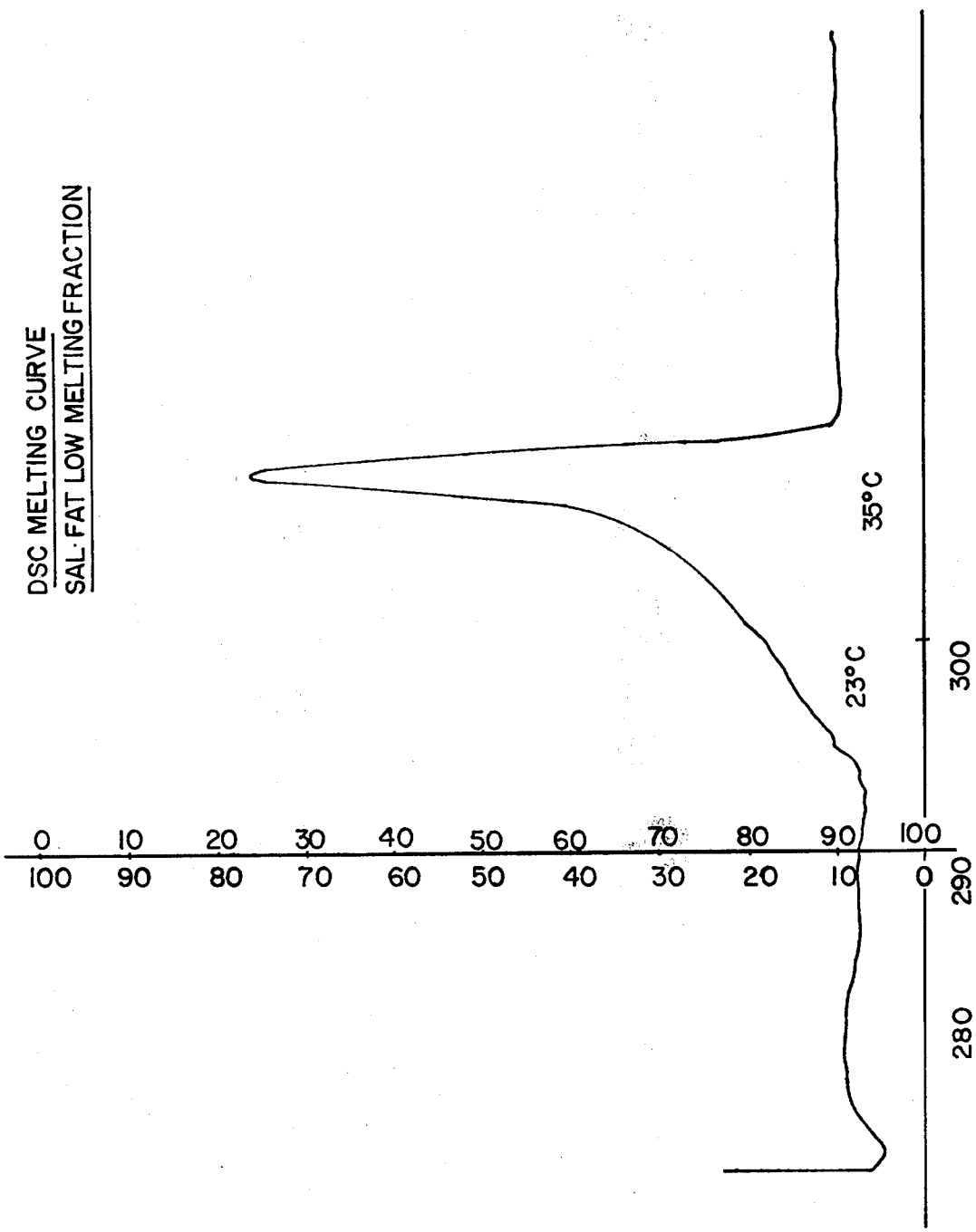

The substitute was then tested for cooling curve (FIG. 1) dilatation (FIG. 2) and thermal profile by differential scanning calorimetry for cocoa butter (FIG. 3) and sal fat (FIG. 4).

The dilation tests were carried out by cooling the melted fat to 0° C. for 90 minutes, tempering it for 48 hours at 26° C. and again cooling to 0° C. before measuring the dilatation at various temperatures. The dilatation results for the substitute along with that of cocoa butter are given below in Table 1.

Table 1

| Dt. | Modified fat | Cocoa Butter |
|---|---|---|
| $D_{20}$ | 2190 | 2025 |
| $D_{25}$ | 1588 | 1558 |
| $D_{30}$ | 1132 | 1118 |
| $D_{35}$ | 50 | 10 |
| $D_{40}$ | 2 | 0 |
| $D_{45}$ | 0 | 0 |

The Jensen cooling curve of the cocoa butter replacement was determined as follows:

About 75 g of sample was heated well about its melting point and placed in a test tube (length - 10 cm), a glass loop stirrer and a thermometer were inserted and the assembly was immersed in an air bath at 17° C. The sample was stirred at the rate of six stokes per minute until solidification occurred. A similar trial was carried out with a sample of cocoa butter and the cooling curves of temperature against time for each sample was plotted. These curves are shown in FIG. 1 of the accompanying drawing to the provisional specification in which curve 1 indicates the temperature rise on solidification in the case of cocoa butter and curve 2 indicates the same for the modified fat.

The above mentioned modified vegetable fat comprising of low melting fraction was used at various levels such as 5, 10, 15, 20 and 25% by replacing cocoa butter in the manufacture of our chocolates. Chocolates so manufactured were found to have similar physical and moulding characteristics as those of standard chocolates.

We claim:

1. A process for the production of modified vegetable fat which comprises the steps of:
    (a) partially hydrogenating at a temperature of 100° to 180° C. a refined, bleached, and deodorized vegetable fat selected from the group consisting of sal seed fat, mowrah fat, phulwara fat and the mixtures thereof and containing glycerides of $C_{16}$, $C_{18}$ and $C_{20}$ acids, in the presence of a conventional metal catalyst to obtain hardened fat of an iodine value in the range of about 33 to 36 and containing less than about 2% trisaturated glycerides; and
    (b) removing from said hardened fat high melting glycerides by thermal crystallization at a temperature of about 30° C. to 40° C. and recovering a low melting fat having an iodine value of about 37–40.

2. The process defined in claim 1, step (a) wherein the vegetable fat is a mixture of sal seed fat with mowrah fat and/or phulwara fat.

3. The process defined in claim 1 step (a) wherein the pressure is between atmosphere pressure and 35 lbs/in$^2$.

4. The process defined in claim 1, step (a) wherein the metal catalyst is a supported fresh nickel catalyst.

5. The process defined in claim 1, step (b) wherein thermal crystallization is carried out between 33° C. to 38° C.

6. The process defined in claim 5 wherein thermal crystallization is carried out between 34° C. to 36° C.

7. The process defined in claim 1 wherein the hardened fat is maintained in molten form throughout steps (a) and (b).

8. The process defined in claim 1 wherein prior to step (a) the refined, bleached, and deodorized vegetable fat prior to undergoing partial hydrogenation is treated with a reagent containing sodium acetate and acetic acid buffer for removal of ellaqic acid and ellaqitannins.

* * * * *